United States Patent
Yu

(10) Patent No.: US 6,567,034 B1
(45) Date of Patent: May 20, 2003

(54) DIGITAL BEAMFORMING RADAR SYSTEM AND METHOD WITH SUPER-RESOLUTION MULTIPLE JAMMER LOCATION

(75) Inventor: Kai-Bor Yu, Niskayuna, NY (US)

(73) Assignee: Lockheed Martin Corporation

( * ) Notice: Subject to any disclaimer, the term of this patent is extended or adjusted under 35 U.S.C. 154(b) by 0 days.

(21) Appl. No.: 09/947,026

(22) Filed: Sep. 5, 2001

(51) Int. Cl.$^7$ .................... G01S 7/36; G01S 13/00; G01S 5/02
(52) U.S. Cl. ................. 342/16; 342/77; 342/80; 342/149; 342/195; 342/417; 342/427
(58) Field of Search ................. 342/80, 147, 148, 342/149, 152, 194, 195, 16, 90, 77, 417, 427

(56) References Cited

U.S. PATENT DOCUMENTS

| | | | |
|---|---|---|---|
| 4,835,689 A | 5/1989 | O'Donnell | 364/413.25 |
| 4,982,150 A | 1/1991 | Silverstein | 324/77 |
| 4,989,143 A | 1/1991 | O'Donnell et al. | 364/413.25 |
| 5,068,597 A | 11/1991 | Silverstein et al. | 324/77 |
| 5,117,238 A | 5/1992 | Silverstein | 342/373 |
| 5,262,785 A | 11/1993 | Silverstein | 342/162 |
| 5,262,789 A | 11/1993 | Silverstein | 342/368 |
| 5,294,933 A | 3/1994 | Lee et al. | 342/159 |
| 5,371,506 A * | 12/1994 | Yu | 342/380 |
| 5,487,306 A | 1/1996 | Fortes | 73/597 |
| 5,515,060 A | 5/1996 | Hussain et al. | 342/376 |
| 5,531,117 A | 7/1996 | Fortes | 73/602 |
| 5,600,326 A | 2/1997 | Yu et al. | 342/17 |
| 5,630,154 A | 5/1997 | Bolstad et al. | 395/800 |
| 5,892,700 A | 4/1999 | Haardt | 364/807 |
| 6,018,317 A * | 1/2000 | Dogan et al. | 342/378 |
| 6,084,540 A | 7/2000 | Yu | 342/17 |
| 6,087,974 A | 7/2000 | Yu | 342/62 |
| 6,157,677 A | 12/2000 | Martens et al. | 375/240.16 |
| 6,404,379 B1 * | 6/2002 | Yu et al. | 342/80 |

OTHER PUBLICATIONS

Wax and Kailath, "Detection of Signals by Information Theoretic Criteria", IEEE Transactions on Acoustics, Speech and Signal Processing, vol. ASSP–33, No. 2, pp. 387–392, 1985.

Akaike, "A New Look at the Statistical Model Identification", IEEE Transaction on Automatic Control vol. AC–19, No. 6, pp. 716–723, 1974.

Steyskal and Rose, "Digital Beamforming for Radar Systems", Microwave Journal, pp. 121–136 1989.

Steyskal, "Digital Beamforming Antennas", Microwave Journal, pp. 107–124, 1997.

Davis et al. "Nulling Over Extremely Wide Bandwidth When Using Stretch Processing", The MITRE Corp., p. 1–6, date unknown.

Brookner and Howell "Adaptive —Adaptive Array Processing", Proceedings of the IEEE, vol. 74, No. 4, Apr. 1986, pp. 602–604.

Baltersee, Jens, "Smart Antennas and Space–Time Processing", visited Aug. 14, 1921, http://www.ert.rwth–aachen.de/Personen/baltersee/smart/smart.html.

Plonski, Matthwe, "CSD Jul. 2000/Feature: Smart Antenna Schemes for E–911", pp. 1–7, http://www.csdmag.com/main/2000/07/0007feat4.htm visited Aug. 13, 2001.

Ebihara, et al., Music Algorithm for a Directional Borehole Radar Using a Conformal Array Antenna, date unknown.

(List continued on next page.)

Primary Examiner—Stephen C. Buczinski
(74) Attorney, Agent, or Firm—Duane Morris LLP

(57) ABSTRACT

In a radar system, sampled aperture data are received from an antenna array. The sampled aperture data include data that do not correspond to echo returns from a beam transmitted by the antenna. A covariance matrix is generating using the sampled aperture data. An eigenvalue decomposition is performed on the covariance matrix. A direction of arrival is determined from which at least one jammer is transmitting a signal included in the sampled aperture data, based on the eigenvalue decomposition.

30 Claims, 2 Drawing Sheets

OTHER PUBLICATIONS

Cheney, Margaret "The Linear Sampling Method and the MUSIC Algorithm", Apr. 2, 2001, pp. 1–6, CODEN:LUTEDX/(TEAT–7089)/1–6/(2000).

Liu et al., An ESPRIT Algorithm for Tracking Time–Varying Signals, TR 92–54, Apr. 24, 1992, pp. 1–22.

Haykin, Simon "Modern Filters", Macmillan Publishing Co., New York, NY, 1989, pps. 2, 324, 330–333, 337–343.

Schmidt, R.O. Multiple Emitter Location and Signal Parameter Estimation, IEEE, vol. AP–34, No. 3, Mar. 1986.

* cited by examiner

DIGITAL BEAMFORMING RADAR SYSTEM AND METHOD WITH SUPER-RESOLUTION MULTIPLE JAMMER LOCATION

FIELD OF THE INVENTION

The present invention relates to radar systems and methods generally, and more specifically to methods of detecting a jammer.

BACKGROUND OF THE INVENTION

U.S. Pat. No. 5,600,326 to Yu, et al. describes a system for adaptive beamforming so as to null one mainlobe and multiple sidelobe jammers. Yu addresses a problem wherein the monopulse technique for direction of arrival (DOA) estimation failed when there was sidelobe jamming (SLJ) and/or main lobe jamming (MLJ). If not effectively countered, electronic jamming prevents successful radar target detection and tracking. The situation is exacerbated by introduction of stealth technology to reduce the radar cross section (RCS) of unfriendly aircraft targets. The frequency dependence of the RCS encourages use of lower microwave frequency bands for detection. This leads to large apertures to achieve angular resolution. Large apertures to achieve small beamwidth results in interception of more jamming. On the other hand, constrained apertures lead to wider beamwidth, which implies interception of more mainlobe jamming.

Adaptive beamforming techniques have been used to form a beam having one or more nulls pointing in the direction of one or more respective jammers. When there is no jamming, Taylor and Bayliss weightings are typically used for sum beams and difference beams, respectively, so as to have a narrow mainlobe and low sidelobes. The quiescent Taylor and Bayliss weightings are designed for reducing the sidelobes in a practical system. In the presence of jamming, the weights are adapted so as to form nulls responsive to the jammers.

Adaptive receiving arrays for radar maximize the ratio of antenna gain in a specified scan direction to the total noise in the output signal. The sum and difference beams at array outputs are determined by adaptive receiving array techniques, which serve to null the interference sources. The adaptivity involves using multipliers to apply an adaptive weight to antenna array signals furnished at multiplier inputs. Because of the adaptivity, the sum and difference patterns vary with the external noise field and are distorted relative to the conventional monopulse sum and difference beams, which possess even and odd symmetry, respectively, about a prescribed boresight angle. The adaptive weights for the sum and difference beams are determined so that the antenna patterns are distorted. This technique cancels both the mainlobe and sidelobe jammers but distorts the monopulse ratio.

Yu et al. describe a sample matrix inverse approach for jamming cancellation, which effectively forms nulls responsive to jammers. The covariance matrix is inverted in order to form the adaptive weighting coefficients. If one of the jammers is within the mainbeam, a null is formed responsive to the mainlobe jammer and the mainbeam is distorted. In order to maintain the mainbeam without distortion, the mainlobe jammer effect is excluded from the covariance matrix estimate. This may be accomplished by using a modified covariance matrix in forming the adapted row beamforming weights, from which information of the mainlobe jammer has been removed (so there is no null responsive to the mainlobe jammer). Yu et al. use prefiltering to block the mainlobe jammer.

Although the matrix inverse approach can generate desired adaptive weights for pointing nulls toward jammers, this technique does not output the locations of the jammers. To implement active countermeasures (such as sending energy at a particular frequency or band of frequencies to a jammer), it is necessary to know the location of the jammer. In order to determine the DOA of a jammer using the prior art techniques, it was necessary to "point" the receiving antenna array at the jammer, essentially placing the jammer in the mainlobe. Thus, an improved system is desired.

SUMMARY OF THE INVENTION

The present invention is a method and system for locating a radar jammer. Sampled aperture data are received from an antenna array. The sampled aperture data include data that do not correspond to echo returns from a beam transmitted by the antenna. A covariance matrix is generating using the sampled aperture data. An eigenvalue decomposition is performed on the covariance matrix. A direction of arrival is determined from which at least one jammer is transmitting a signal included in the sampled aperture data, based on the eigenvalue decomposition.

DETAILED DESCRIPTION

U.S. Pat. No. 5,600,326 to Yu, et al. and U.S. Pat. No. 6,087,974 to Yu are incorporated herein by reference in their entireties, for their teachings on monopulse radar systems.

The present invention is a method and system for determining the angular location of at least one mainlobe or sidelobe jammer. The preferred embodiment allows determination of the DOA of one or more mainlobe jammers and/or one or more sidelobe jammers. Conventional radars locate a jammer by pointing the beam at the jammer once in a while. In the exemplary embodiment of the present invention, sampled aperture data, collected during normal target surveillance and tracking, are used to obtain the jammer DOA and update the DOA continuously.

Figure 1:
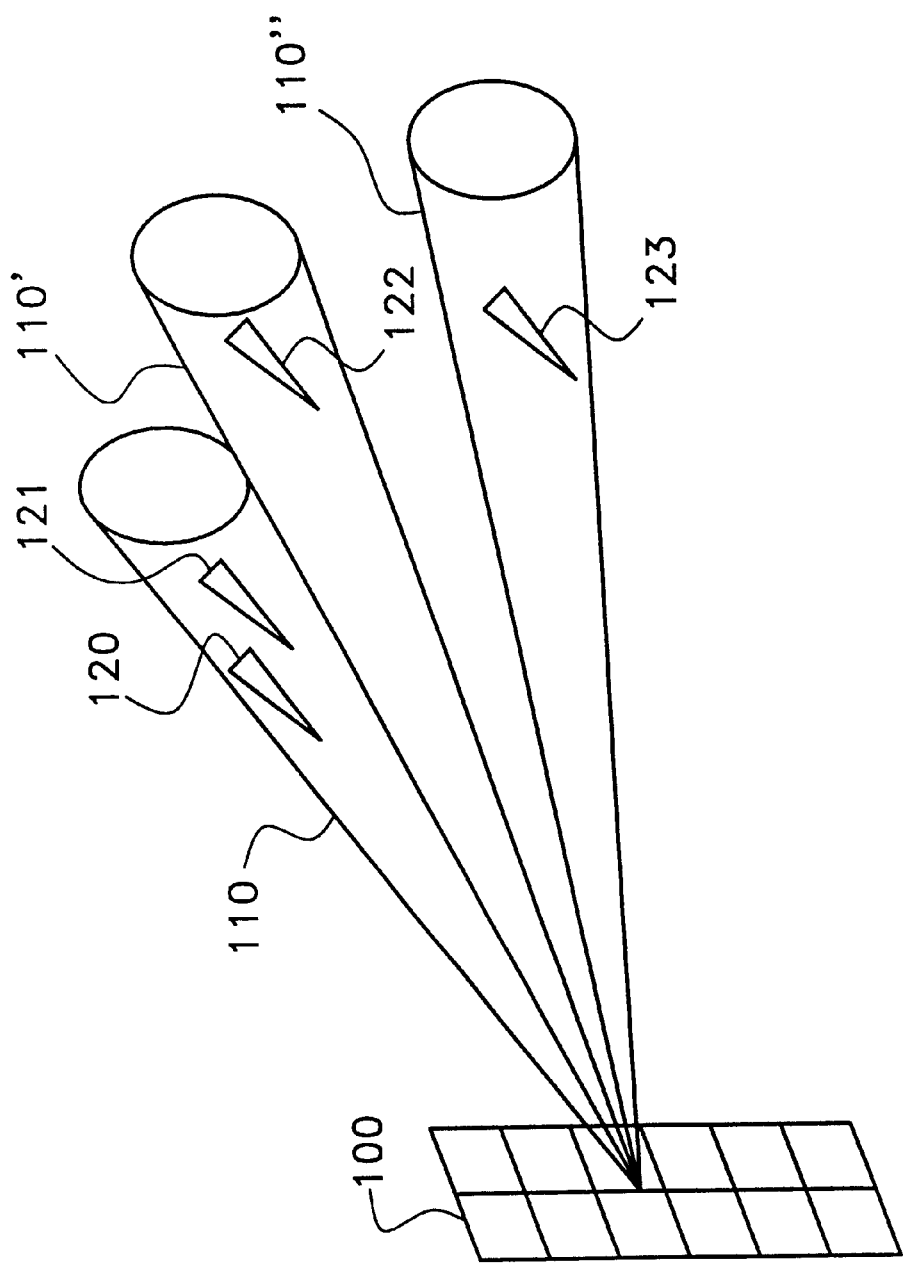
FIG. 1 is a diagram showing a plurality of jammers transmitting signals to a radar antenna array in an exemplary system according to the present invention.

FIG. 1 shows an environment in which the invention may be practiced. A radar antenna array 100 may receive signals from a plurality of jammers 120–123. While jammers 120, 121 are located within the mainlobe 110, jammers 122, 123 are located within sidelobes. Antenna 100 may be part of a system operating in surveillance mode. Thus, at different times, the mainlobe may be pointed in the direction shown by beam 110' or in the direction shown by beam 110". Note that at different times, jammer 122 may be in the mainlobe 110' (while jammers 120, 121 and 123 are in sidelobes) or jammer 123 may be in the mainlobe 110" (while jammers 120–122 are in sidelobes).

Figure 2:
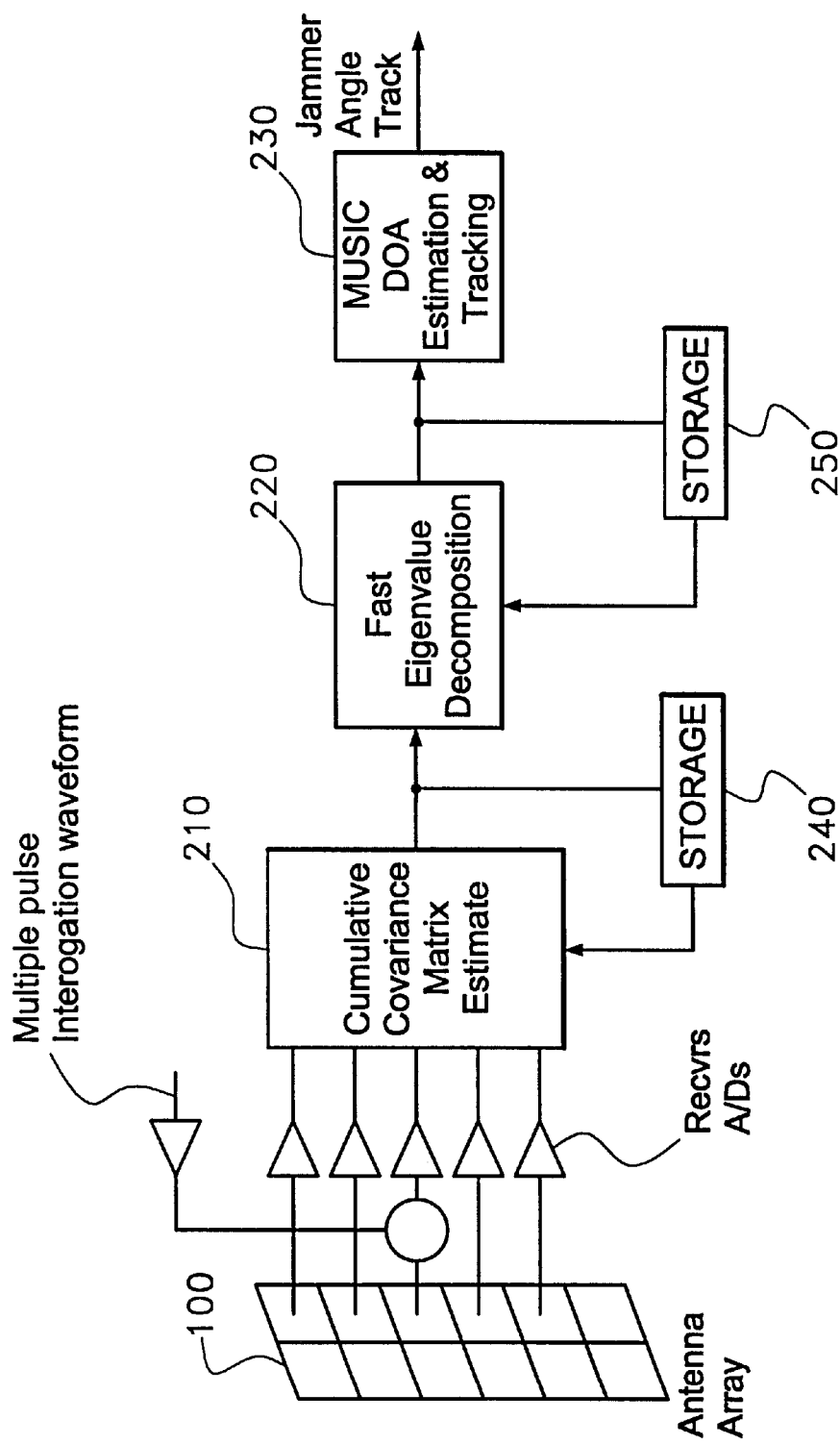
FIG. 2 is a block diagram showing exemplary signal processing performed on the signals received by the antenna array of FIG. 1.

FIG. 2 shows an exemplary system according to the invention. In the exemplary embodiment, it is not necessary to point the mainlobe of the antenna 100 in the direction of a jammer to be able to locate the jammer. The DOA can be determined using sampled aperture data received by the antenna array 100. The sampled aperture data include data that do not correspond to echo returns from a beam transmitted by the antenna 100. Because the jammers 120–123 transmit energy independently of the beam transmitted by antenna 100, the system can passively collect the sampled aperture data by collecting data while echo returns from the energy transmitted by antenna 100 are not being received. Energy from jammers 120–123, which arrives within the sidelobes, is still identified. Thus, the sampled aperture data for jammer location determination can be obtained regardless of whether the radar system is being operated in surveillance or tracking mode.

The invention may be practiced using conventional radar hardware, include an antenna array 100, receivers and analog-to-digital converters.

In block 210, a covariance matrix is estimated using the sampled aperture data. This can be the same covariance matrix formed to generate the adaptive weighting coefficients. At least the initial covariance matrix is formed by block processing. Preferably, updates are estimated to allow rapid, real-time or near real-time processing, for example, using a sliding window to update the covariance matrix.

In block 220, an eigenvalue decomposition is performed on the covariance matrix. The number of jammers is determined by the number of significant eigenvalues of the covariance matrix found while the antenna array 100 is not transmitting. More formal statistical methods, such as the Akaike Information Criterion (AIC) or Minimum Description length (MDL) can be used to determine the number of jammers 120–123 within a field of view of the antenna 100 based on the updated eigenvalue decomposition. Eigenvalue decomposition may be performed using a conventional block processing technique. However, in a preferred embodiment, once the eigenvalue decomposition values are initially determined, a fast eigenvalue decomposition update (such as an exemplary technique described below) is performed, to estimate the eigenvalues quickly. Eigenvalue decomposition is numerically intensive. Thus, a fast eigenvalue decomposition update technique allows estimation of the eigenvalues in real-time or near real-time, without interfering with ongoing surveillance and/or tracking activity.

Block 230 explicitly determines a direction of arrival from which at least one jammer 120–123 is transmitting a signal included in the sampled aperture data, based on the eigenvalue decomposition. Preferably, a modern super-resolution subspace algorithm, such as MUSIC, minimum-norm or the like, is used.

Storage devices 240 and 250 are provided. The storage devices may be any conventional data storage devices, including random access memory (RAM), latches, or registers. Each time the covariance matrix is evaluated (or an update thereof is estimated), the results are stored in storage device 240, to be used when updating the covariance matrix on subsequent iterations.

Similarly, each time the eigenvalue decomposition is evaluated (or an update thereof is estimated), the results are stored in storage device 250, to be used when updating the eigenvalue decomposition on subsequent iterations. Recursive, cumulative covariance processing allows estimation of the DOA to be performed in real-time or near real-time with reduced processing resource consumption.

In one example, the updates to the covariance matrix are performed at regular intervals. For example, the regular intervals may have a period of between about one millisecond and about ten milliseconds, corresponding to a frequency between about 100 Hz and 1000 Hz. Each time the covariance matrix is updated, the eigenvalue decomposition is updated, preferably using a fast parallel decomposition technique. By processing recursively, it is possible to use the maximum number of samples within the computational period. Use of sliding window allows the most up-to-date samples to be used. The covariance processing can be performed continuously in the background, without interfering with surveillance or tracking of targets. Further, because the sampled aperture data from any given direction can be sampled as often as desired, super-resolution is possible, enabling detection of multiple jammers in one or more sidelobes, and multiple jammers within the mainlobe.

Once determined, the direction of arrival may be provided to a tracker.

Using the above method, angular locations of one or more jammers can be determined, including one or more jammers within the mainlobe of the antenna array 100, and/or one or more jammers located in sidelobes of the antenna array.

Because the exemplary method does not require the mainlobe to be pointed towards a jammer to determine the jammer location, it is possible to detect and track jammers in normal surveillance mode.

In addition to the conventional abilities for target detection and tracking in the presence of jamming, the exemplary embodiment makes it possible to add awareness of the DOA of multiple jammers. This allows the system to monitor and track the locations of jammers.

Although the exemplary embodiment described above uses recursive processing, block processing may alternatively be used. For block processing, the covariance matrix is periodically generated based on additional sampled aperture data. The eigenvalue decomposition is evaluated by block processing each time the covariance matrix is evaluated. The number of jammers within the field of view of the antenna is evaluated based on the updated eigenvalue decomposition. Block processing may be performed every ten pulses (100 Hz), for example.

Fast Eigenvalue Decomposition Processing Algorithm

Eigenvalue Decomposition

Eigenspace decompositions are used in solving many signal processing problems, such as source location estimation, high-resolution frequency estimation, and beamforming. In each case, either the eigenvalue decomposition (EVD) of a covariance matrix or the singular value decomposition (SVD) of a data matrix is performed. For adaptive applications in a non-stationary environment, the EVD is updated with the acquisition of new data and the deletion of old data. This situation arises where the target sources are moving or the sinusoidal frequencies are varying with time. For computational efficiency or for real-time applications, an algorithm is used to update the EVD without solving the EVD problem from scratch again, i.e., an algorithm that makes use of the EVD of the original covariance matrix. In numerical linear algebra, this problem is called the modified eigenvalue problem. Other examples of modified eigenvalue problems include extension and restriction problems where the order of the matrix is modified, corresponding to filter order updating or downdating.

One aspect of the exemplary embodiment of the invention is the use of a fast recursive eigenvalue decomposition method in processing the radar echo signals in a raid-counting mode. Formally, these problems are concerned with computing the eigensystem of Hermitian matrices that have undergone finite changes that are of restricted rank. The rank values of the modified part are usually small compared with the rank values of the original matrices. In these situations, perturbation ideas relating the eigensystem of the modified and original matrices can be exploited to derive a computationally efficient algorithm.

In a time-varying environment, there are two strategies for updating the covariance matrix. The most common one is the rank-1 update, which involves applying an exponential forgetting window to the covariance matrix, i.e., $$\hat{R}=\mu R+(1-\mu)\alpha\alpha^H \quad (1)$$

where R and $\hat{R}$ correspond to the original and updated covariance matrices, respectively, $\mu$ is an appropriate exponential forgetting factor, and $\alpha$ is the most recent data vector. The data vectors correspond to linear prediction sample vectors in frequency estimation or snapshots in array processing. The exponential window approach may have several drawbacks: the influence of old data can last for a very long time, and the exponential forgetting factor, $\mu$, must be determined appropriately.

Another strategy is to use a sliding window, which is analogous to short-time signal analysis, where data within the window is assumed to be stationary. This strategy corresponds to adding a row to and deleting a row from the data matrix, simultaneously, or to the following rank-2 covariance matrix update problem:

$$\hat{R}=R+\alpha\alpha^H-\beta\beta^H \quad (2)$$

where $\alpha$ is the data vector to be included, and $\beta$ is the data vector to be deleted. The eigenvalue can be computed explicitly when the order of the matrix is less than 5 (say, 3 or 4) after deflation. One can also add and delete blocks of data, leading to the general rank-κ modification problem, and one can modify equation (2), or the rank-κ modification problem, by adding weighting factors, thus indicating the relative weight of the previous covariance matrix and the new data vector in forming the new covariance matrix estimate.

Simultaneous data addition and deletion have also been considered in other signal processing applications such as recursive least squares problems. Of course, the modification problem can be solved by applying a rank-1 update as many times as desired. That approach is computationally involved because nonlinear searches for eigenvalues have to be carried out for each rank-1 update, and the procedure is repeated for κ times. Solving this eigenvalue search problem in an efficient way speeds up the process. It should also be noted that subtracting data may lead to ill-conditioning, since the smallest eigenvalue may move toward zero. Theoretically, this should not happen because only different segments of data are used for forming the covariance matrix. Numerically, the ill-conditioning may happen; thus, in general, data subtraction should be avoided. The choice of updating schemes depends on specific applications and assumptions in signal sources. The exemplary embodiment of the present invention provides an algorithm for recursively updating the EVD of the covariance matrix when the covariance matrix is under low-rank updating, which may include data deleting.

An overview of the modified eigenvalue problem for raid counting is provided herein and its application to the recursive updating of the eigen-subspace when the covariance matrix is under low-rank updating. It includes a theoretical framework in which rank-κ updates are related to one another. The spectrum-slicing theorem enables location of the eigenvalue to any desired accuracy by means of the inertia of a much reduced size Hermitian matrix whose elements depend on the eigenvalue parameter, $\lambda$. This idea is incorporated and a complete algorithm and analysis is worked out for updating the eigen-decomposition of the covariance matrix as it arises in eigenbased techniques for frequency or angle of arrival estimation and tracking. A novel algorithm is employed for computing the eigenvector and work out the deflation procedure for rank-κ updates. The efficient procedure for computing eigenvalues is a two-step procedure. It improves the computational complexity from $O(N^3)$ to $O(N^2k)$. The deflation procedure is important for the eigen-subspace updating in high-resolution algorithms, as high filter order leads to multiplicity of noise eigenvalues. If only the principal eigenvalues and eigenvectors need to be monitored (as in the PE algorithm), the noise eigenvalue multiplicity consideration would lead to a highly efficient algorithm. An analysis of the computational complexity indicates an improvement of an order of magnitude from $O(N^3)$ to $O(N^2k)$ when compared with prior known routines. The most efficient EVD-routines involve Householder reduction to tridiagonal form followed by QL iteration.

An efficient algorithm for computing the eigensystem of the modified covariance matrix is described is below. The algorithm involves a nonlinear search for the eigenvalues that can be done in parallel. Once the eigenvalues are obtained, the eigenvectors can be computed explicitly in terms of an intermediate vector, which is a solution of a deflated homogeneous linear system. The general procedure, coupled with the multiplicity of noise eigenvalues in subspace signal processing applications, leads to a highly efficient algorithm for adaptive estimation or tracking problems.

II. UPDATING THE EVD OF THE COVARIANCE MATRIX (A) Modified Eigenvalue Problem

The modified eigenvalue problem is concerned with computing the eigensystem of the modified Hermitian matrix, given the a priori knowledge of the eigensystem, of the original matrix. This specifically concerns the following additive modification:

$$\hat{R}=R+E \quad (3)$$

where $\hat{R}$ and R and $R \in C^{N \times N}$ are the modified and original covariance matrices and $E \in C^{N \times N}$ is the additive modification matrix. This matrix is also Hermitian, and, in general, is of indefinite nature; i.e., it may have negative eigenvalues (corresponding to downdating). Assume E is of rank k, where k is usually much smaller than N. Because E is Hermitian, it has the following weighted outer product expansion:

$$E=USU^H \quad (4)$$

where $U \in C^{N \times k}$ and $S \in R^{k \times k}$ is a nonsingular matrix. For example, equation (4) can be obtained as the eigenvalue and eigenvector expansion of E, where S is a diagonal matrix with eigenvalues on the diagonal and U is the corresponding orthonormal eigenvector matrix. Another example for the decomposition of E, as shown in equation (4), is expressed directly in terms of the data. In that case, S has diagonal elements equal to 1 or −1, corresponding to updating or downdating, respectively, and U is the matrix with the corresponding data vectors. U is then not orthonormal. A priori information of the EVD of R is also available as follows:

$$R=QDQ^H \qquad (5)$$

where $D \in R^{N \times N}$, $Q \in C^{N \times N}$, $D=\text{diag}[d_1, d_2 \ldots d_N]$ is the diagonal eigenvalue matrix, and $Q=[q_1, \ldots q_N]$ is the corresponding eigenvector matrix. Note that Q is an orthonormal matrix, i.e., $$QQ^H=Q^HQ=I \qquad (6)$$

The problem now is to find the modified eigensysterm. Assuming that $\lambda$, x are the eigenpairs, of R, the following expression is obtained:

$$(\hat{R}-\lambda I)x=0 \qquad (7)$$

The eigenvalue can be determined by solving for the zeros of $$\det[\hat{R}-\lambda I]=0 \qquad (8)$$

Substituting $\hat{R}$ from (3) and E from (4) into (7) gives the following expression:

$$(R-\lambda I)x+USU^Hx=0 \qquad (9)$$

It is convenient to split away the rank-k modification aspect from the rest of the problem by inducing the following system of equations, where $y=SU^Hx$ and $y \in C^k$:

$$(R-\lambda I)x+Uy=0 \qquad (10a)$$

$$U^Hx-S^{-1}y=0 \qquad (10b)$$

Solving x in terms of y in (10a) and substituting it into (10b) gives the following:

$$W(\lambda)y=0 \qquad (11)$$

where $$W(\lambda)=S^{-1}+U^H(R-\lambda I)^{-1}U \qquad (12)$$

Note that $W(\lambda)$ can be identified to be the Schur complement of $R-\lambda I$ in $M(\lambda)$, where $$M(\lambda) = \begin{bmatrix} R-\lambda I & U \\ U^H & -S^{-1} \end{bmatrix} \qquad (13)$$

$W(\lambda)$ is also called the Weinstein-Aronszajn (W-A) matrix, which arises in perturbation problems in Hilbert space operators. The modified eigenvalues can be obtained from solving $\det[W(\lambda)]=0$ rather than from equation (8). In fact, $\lambda$ is an eigenvalue of $\hat{R}$, i.e., $\lambda \in \lambda(\hat{R})$ if and only if $\lambda$ is a solution of $\det[W(\lambda)]=0$. This can be derived easily by using the known Schur equation on equation (13), leading to $$\det[R-\lambda I] = \frac{\det[M(\lambda)]}{\det[S^{-1}]} \qquad (14)$$

Because S is invertible, $\det[\hat{R}-\lambda I]=0$ will imply $\det[M(\lambda)]=0$. Also, $\det[M(\lambda)]$ can be expressed as $$\det[M(\lambda)]=(-1)^k \det[R-\lambda I]\det[W(\lambda)]$$

leading to $$\det[W(\lambda)] = (-1)^k \frac{\det[M(\lambda)]}{\det[R-\lambda I]} \qquad (15)$$

$$= (-1)^k \frac{\prod_{i=1}^{N}(\hat{\lambda}_i - \lambda)}{\prod_{i=1}^{N}(\lambda_i - \lambda)}$$

with $\hat{\lambda}_i \in \lambda(\hat{R})$ and $\lambda_i \in \lambda(R)$. Thus $\{\hat{\lambda}_i\}$ and $\{\lambda_i\}$ are the zeros and poles of the rational polynomial $\det[W(\lambda)]$. Note that the above derivation is valid only when the eigenvalues of R and $\hat{R}$ are distinct. In fact, $R-\lambda I$ in equation (12) is not invertible when $\lambda$ coincides with one of the eigenvalues of R. A deflation procedure is prescribed when some of the eigenvalues of the modified and original matrices are in fact the same. Note that $w(\lambda)=\det[W(\lambda)]$ is a nonlinear equation, which is easy to evaluate. $W(\lambda)$ is a k×k matrix which is of a dimension much smaller than the N×N matrix $\hat{R}-\lambda I$. Moreover, the resolvant $(R-\lambda I)^{-1}$ is easy to compute if the EVD of R is available, i.e., $$W(\lambda)=S^{-1}+U^HQ(D-\lambda I)^{-1}Q^HU \qquad (16)$$

where $(D-\lambda I)$ is a diagonal matrix. The fast algorithm to be described depends on a spectrum-slicing theorem relating the eigenvalues of the modified matrix to the eigenvalues of the original matrix. This theorem enables the search to be localized in any interval. Moreover, the search can be carried out in parallel, leading to an efficient implementation.

Deflation

Several situations exist for deflating the problem. The details of two situations are described: (1) U is orthogonal to $q_i$, and (2) there are multiplicities of the eigenvalues of the original covariance matrix. The consideration here is for rank-k update. Other special situations exist where the problem can be deflated immediately, such as the existence of zero elements in the update vector. For the first case, $q_i^H U=0$; therefore $d_i$ and $q_i$ remain the eigenpair of the modified matrix $\hat{R}$. For the second case, if $\lambda$ is an eigenvalue of multiplicity m with the corresponding set of eigenvectors $Q=[q_i \ldots q_m]$, it is then possible to perform a Householder transformation on Q, such that the last M-1 eigenvalues are orthogonal to $u_1$ (where $U=[u_1 \ldots u_k]$), i.e., $$QH_1 = \lfloor q_1^{(1)} \ldots q_m^{(1)} \rfloor \Delta Q^{(1)} \qquad (17a)$$

$$q_i^{(1)H} u_1 = 0 \quad i=2, \ldots m \qquad (17b)$$

Thus, $\{q_i^{(1)}\}_{i=2}^{m}$ remain the eigenvectors of $\hat{R}$ corresponding to eigenvalue $\lambda$. The Householder matrix $H_1$ is an orthogonal matrix given by $$H_1 = 1 - \frac{2(b_1 b_1 H)}{b_1 H b_1} \qquad (18)$$

where $$b_1=z+\sigma e_1$$

with $Q^H u_1 = z$, $\sigma \|z\|_2$ and $e_1 = [1, 0 \ldots 0]^H$. Now let $Q_1 = [q_2^{(1)} \ldots q_m^{(1)}]$, and after performing another appropriate Householder transformation, we obtain $$\hat{Q}^{(1)} H_2 = [q_2^{(2)} q_3^{(2)} \cdots q_m^{(2)}] q_i^{(2)H} u_2 = 0 \; i = 3, \ldots m \quad (19)$$

After continuing this procedure k times until $$\hat{Q}^{(k-1)} H_k = [q_k^{(k)} q_{k+1}^{(k)} \ldots q_m^{(k)}] q_i^{(k)H} u_k = 0 i = k+1, \ldots m \quad (20)$$

then $\{q_i^{(k)}\}_{i=k+1}^m$ are the eigenvectors of $\hat{R}$ with $\lambda \in \lambda(\hat{R})$ of multiplicity m−k.

Spectrum-Slicing Theorem

Assuming all deflation procedures have been carried out, i.e., all $d_i$ are distinct and $q_i^H U = 0$, a computationally efficient algorithm can be used to locate the eigenvalues to any desired accuracy. The fast algorithm that allows one to localize the eigenvalue search depends on the following spectrum-slicing equation:

$$N_{\hat{R}}(\lambda) = N_R(\lambda) + D^+[W(\lambda)] - D^+[S] \quad (21)$$

where $N_{\hat{R}}(\lambda)$ and $N_R(\lambda)$ are the number of eigenvalues of $\hat{R}$ and R less than $\lambda$, respectively, $D^+[W(\lambda)]$ is the positive inertia of $W(\lambda)$ (i.e., the number of positive eigenvalues of $W(\lambda)$ and, likewise, $D^+[S]$ is the positive inertia of S. The above spectrum-slicing equation (21) provides information of great computational value. $W(\lambda)$ is easy to compute for each value of A. If $Q^H U$ is computed and stored initially, the dominant cost is on the order of $Nk^2$ floating-point operations per evaluation. Upon evaluating the W-A matrix $W(\lambda)$, one may then compute its inertia efficiently from an $LDL^H$ or the diagonal pivoting factorization. This requires $k^3$ number of operations. The value of $N_R(\lambda)$ is available readily, as the EVD of R. $D^+[S]$ can be determined easily either from the EVD of E (because only a few eigenvalues are nonzero) or from counting the number of the data vectors to be added (assuming they do not align with each other). This needs to be determined only once. The spectrum-slicing equation provides an easy mechanism for counting the eigenvalues of $\hat{R}$ in any given interval. This information enables one to localize the search in much the same way as Sturm sequence/bisection techniques are used in polynomial root finding. The bisection scheme can be carried out until convergence occurs. The convergence rate is linear. The eigenvalue search algorithm can be summarized as follows:

1. Use the knowledge of the original spectrum and equation (21) to localize the eigenvalues to disjoint intervals.
2. For each iteration step of each eigenvalue search in the interval (l, u) set $$\lambda = \frac{l+u}{2}, \text{ and test it with } N_{\hat{R}}(\lambda)$$

(equation (21)). Repeat until convergence to desired accuracy.

Since the distribution of the eigenvalue of the original matrix is known, the eigenvalues can be localized to disjoint intervals easily by using equation (21). For the bisection search, the dominant cost for each iteration is the evaluation of $W(\lambda)$ and the $LDL^H$ decomposition for the evaluation of $W(\lambda)$.

This algorithm can be illustrated by considering the following numerical example. Let the original covariance matrix be given by R=diag(50, 45, 40, 35, 30, 25, 20, 15, 10, 5). Thus the eigenvalues are the diagonal elements, and the eigenvectors are the unit vectors $$\{e_i\}_{i=1}^{10}.$$

Now assume the covariance matrix undergoes the following rank-3 modification given by $$\hat{R} = R + u_1 u_1^t + u_2 u_2^t + u_3 u_3^t$$

where $u_1$, $u_2$, and $u_3$ are randomly generated data vectors given by [0.3563, −0.2105, −0.3559, −0.3566, 2.1652, −0.5062, −1.1989, −0.8823, 0.7211, −0.00671$^t$ [−0.5539, −0.4056, −0.3203, −1.0694, −0.5015, 1.6070, 0.0628, −1.6116, −0.4073, −0.59501$\}^t$, and [0.6167, −1.1828, 0.3437, −0.3574, −0.4066, −0.3664, 0.8533, −1.5147, −0.7389, 2.1763]$^t$. Thus S=diag(1,1, 1) and $D^+[S]=3$. For this example, the resulting eigenvalues are $\lambda$=(51.1439, 47.1839, 40.6324, 36.9239, 36.0696, 27.6072, 22.1148, 20.0423, 11.0808, 8.6086). Now let us illustrate how (21) can be used to locate the eigenvalues accurately. Start with the interval (20, 25). The associated W-A matrices are evaluated and the inertias computed. The counting formulas evaluated at 20+$\epsilon$ and 25−$\epsilon$ ($N_{\hat{R}}(25-\epsilon)=4$, $N_{\hat{R}}(20+\epsilon)=2$, $\epsilon$=a small constant depending on accuracy requirement) indicate that there are two eigenvalues in the interval (20, 25).

This interval is then split into intervals (20, 22.5) and (22.5, 25). Evaluating the counting equation indicates that an eigenvalue has been isolated in each disjoint interval. Bisection can then be employed to the desired accuracy. Table 1 illustrates the iteration steps for the interval (20, 21.25) for an accuracy of $10^{-3}$ digits. It converges to 20.0425 in 12 steps. The maximum number of iterations required for convergence depends on the interval, (l,u), to be searched and the accuracy requirement, $\epsilon$. This number q can be determined such that $2^q > (u-l)/\epsilon$ and is given by Table 2.

TABLE 1

Bisection Search for Eigenvalues Using the Spectrum-Slicing Equation

| Bi-section Step | Interval | Midpoint | $N_R(\lambda)$ | $D^+[W(\lambda)]$ | $N_{\hat{R}}(\lambda)$ |
|---|---|---|---|---|---|
| 1 | (20,21.25) | 20.625 | 4 | 2 | 3 |
| 2 | (20,20.625) | 20.3125 | 4 | 2 | 3 |
| 3 | (20,20.3125) | 20.1563 | 4 | 2 | 3 |
| 4 | (20,20.1563) | 20.0782 | 4 | 2 | 3 |
| 5 | (20,20.0782) | 20.0391 | 4 | 1 | 2 |
| 6 | (20.0391,20.0782) | 20.0587 | 4 | 2 | 3 |
| 7 | (20.0391,20.0587) | 20.0489 | 4 | 2 | 3 |
| 8 | 20.0391,20.0489) | 20.044 | 4 | 2 | 3 |
| 9 | (20.0391,20.044) | 20.0416 | 4 | 1 | 2 |
| 10 | (20.0416,20.044) | 20.0428 | 4 | 2 | 3 |
| 11 | (20.0416,20.0428) | 20.0422 | 4 | 1 | 2 |
| 12 | (20.0422,20.0428) | 20.0425 | 4 | 2 | 3 |

When an interval has been found to contain a single eigenvalue, $\lambda$, then bisection is a rather slow way to pin down $\lambda$, to high accuracy. To speed up the convergence rate, a preferable strategy would be to switch to a rapidly root-finding scheme after the roots have been sufficiently localized within subintervals by using the counting equation. Root-finding schemes, including variation of secant methods, can be employed. The order of convergence is 1.618 for secant methods, as against 1 for bisection. Thus convergence can be accelerated.

Eigenvector

Once the eigenvalues are obtained, the eigenvectors can be evaluated efficiently in two steps. First, the intermediate vector y can be solved from the k×k homogeneous Hermitian system (11). y can actually be obtained as the byproduct of the $LDL^H$ decomposition of $W(\lambda)$; i.e., y is the zero eigenvector of $W(\lambda)$ for the convergent eigenvalue $\lambda$. The eigenvector x can then be computed explicitly using equation (10a). This two-step procedure is much more efficient than solving the original N×N homogeneous system of equation (7) or the conventional eigenvector solver using the inverse iteration. The explicit expression x relating y is given by $$x = -(R - \lambda I)^{-1} U y \quad (22a)$$
$$= -Q(D - \lambda I)^{-1} Q^H U y$$
$$= -\sum_{i=1}^{N} \frac{q_i^H U y}{(d_i - \lambda)} q_i$$

Normalizing x gives the update eigenvectors $\hat{q}$, i.e., $$\hat{q} = \frac{x}{\|x\|_2} \quad (22b)$$

TABLE 2

| Number of Subintervals to be Searched | Number of Iteration Steps |
|---|---|
| $10^2$ | 7 |
| $10^3$ | 10 |
| $10^4$ | 14 |
| $10^5$ | 17 |
| $10^6$ | 20 |

The computational complexity for solving the k×k homogeneous Hermitian system is $O(k^3)$ and the back substitution of equation (22) involves an order of magnitude $O(N^2k)$. This is to be contrasted to the Householder reduction followed by QL Implicit Shift, which requires complexity of order of magnitude $O(N^3)$. Similarly, the inverse iteration requires $O(N^3)$. This represents an order of magnitude improvement from $O(N^3)$ to $O(N^2k)$.

For completeness, a discussion on the rank-1 and rank-2 updates is provided. Since $w(\lambda)$ and its derivatives can be evaluated easily for these two cases, Newton's method can be employed for the eigenvalue search. Some new results were obtained as we worked out the complete algorithm, including the deflation procedure (for high-order rank updates), bounds for the eigenvalues (derived from the spectrum-slicing theorem instead of DeGroat and Roberts' generalized interlacing theorem), as well as the explicit eigenvector computation.

(B) Rank-1 Modification

For rank-1 updating modification $\hat{R}=R+\alpha\alpha^H$, the modification matrix E can be identified with $E=\alpha\alpha^H$, corresponding to the decomposition equation (4) with $U=\alpha$ and $S=1$.

$W(\lambda)$ is a 1×1 matrix, which is also equal to the determinant $w(\lambda)$, i.e., $$w(\lambda) = 1 + \alpha^H (R - \lambda I)^{-1} \alpha \quad (23)$$
$$= 1 + \sum_{i=1}^{N} \frac{|q_i^H \alpha|^2}{(d_i - \lambda)}$$

This is a rational polynomial, with N roots corresponding to N eigenvalues.

It is assumed that this is an N×N problem for which no deflation is possible. Thus, all $d_i$ are distinct, and $q_i^H \alpha \neq 0$. The eigenvalues $\lambda_i$, of the rank-1 modified Hermitian matrix satisfy the following interlacing property:

$$d_i < \lambda_i < d_{i-1} \quad i=1,2,\ldots N \quad (24a)$$

with $d_0 = d_1 + |\alpha|^1$. Therefore, the search intervals for each $\lambda_i$ can be restricted to $I_i = (d_i, d_{i-1})$, for all $i=1,2,\ldots N$. For downdating, $\hat{R} = R - \beta\beta^1$, the interlacing equation is given by $$d_{i+1} < \lambda_i < d_i \quad i=1,2,\ldots N \quad (24b)$$

where $d_{N+1} = d_N - |\beta|^2$. The corresponding search intervals for each $\lambda$ can be restricted to $I=(d_{i+1}, d_i)$. An iterative search technique can then be used on $w(\lambda)$ to identify the updated eigenvalues. The function $w(\lambda)$ is a monotone increasing function between its boundary points because $$w'(\lambda) = \sum_{i=1}^{N} \frac{|q_i^H \alpha|^2}{(d_i - \lambda)^2} > 0 \quad (25)$$

Thus, the following Newton's method, safeguarded with bisection, can be applied in an iterative search to identify the j-th eigenvalue, $\lambda$. For convenience, let us denote the endpoints of the interval by $l=d_j$, and $u=d_{j-1}$. The full set of eigenvalues can be solved in parallel by using the following iterative algorithm for each eigenvalue:

$$\lambda_*^{(k+1)} = \lambda^{(k)} - \frac{w(\lambda^{(k)})}{w'(\lambda^{(k)})} \quad (26)$$

$$\lambda^{(k+1)} = \begin{cases} \lambda_*^{(k+1)} & \text{if } \lambda_*^{(k+1)} \in I_j \\ \frac{\lambda^{(k)} + u}{2} & \text{if } \lambda_*^{(k+1)} \rangle u, \lambda^{(k)} \text{ replaces } l \\ \frac{\lambda^{(k)} + l}{2} & \text{if } \lambda_*^{(k+1)} \langle l, \lambda^{(k)} \text{ replaces } u \end{cases} \quad (27)$$

and stopping if $|\lambda^{(k+1)} - \lambda^{(k)}| < \delta \lambda^{(k+1)}$, where $\delta$ is the convergence threshold. Note that when an iteration goes outside the restricted zone, since the gradient is greater than zero, this indicates the direction in which the solution is to be found. Consequently, the interval can be further restricted as indicated. Newton's method is guaranteed to converge, and this convergence is quadratic near the solution. It should be noted that Newton's method is based on a local linear approximation to the function $w(\lambda)$. Since $w(\lambda)$ is a rational function, it is possible to speed up the convergence rate by using simple rational polynomials for local approximations.

Once the eigenvalues are determined to sufficient accuracy, the eigenvector can be solved in a procedure described in (24). It is given explicitly as follows:

$$x = -\sum_{i=1}^{N} \frac{q_i^H \alpha}{(d_i - \lambda)} q_i \quad (28a)$$

$$\hat{q} = \frac{x}{\|x\|_2} \quad (28b)$$

Exponential Window Rank-1 Update

This procedure can be modified to accommodate the exponential window easily. For the following exponential window, rank-1 updating modification $\hat{R} = \mu R + (1-\mu)\alpha\alpha^H$ the Weinstein-Aronszajn matrix $W(\lambda)$ is a 1×1 matrix, which is also equal to the determinant $w(\lambda)$, $$W(\lambda) = 1 + (1 - \mu)\alpha^H (\mu R - \lambda I)^{-1} \alpha \quad (29)$$

$$= 1 + (1 - \mu) \sum_{i=1}^{N} \frac{|q_i^H \alpha|^2}{(\mu d_i - \lambda)}$$

The N roots are the updated eigenvalue. They must satisfy the following modified interlacing property:

$$\mu d_i < \lambda_i < \mu d_{i-1} \quad i=1,2 \ldots N \quad (30)$$

With $ud_0 = ud_1 + |a|^2$. Therefore, the search intervals for each $\lambda_i$ can be restricted to $I_i = (\mu d_i, \mu d_{i-1})$ for all $i = 1, 2 \ldots N$. Assuming eigenvalues do not change dramatically from one update to another, $d_i$ would be a good initial estimate for $\lambda_i$. Once the eigenvalues are determined to sufficient accuracy, the eigenvector is given explicitly as follows:

$$\hat{x}_i = -(1 - \mu) \sum_{k=1}^{N} \frac{(q_k^H \alpha) q_k}{(\mu d_k - \lambda_i)} \quad (31)$$

This can be normalized accordingly.

(C) Rank-2 Modification

For a rank-2 modification problem, equation (4) can be expressed in the following:

$$\hat{R} = R + [\alpha\beta] \begin{bmatrix} 1 & 0 \\ 0 & -1 \end{bmatrix} \begin{bmatrix} \alpha^H \\ \beta^H \end{bmatrix} \quad (32)$$

$$= R + USU^H$$

where $U = [\alpha\beta]$ and $S = \text{diag}(1, -1)$. The Weinstein-Aronszajn matrix $W(\lambda)$ is now given by $$W(\lambda) = S^{-1} + U^H Q(D - \lambda I)^{-1} Q^H U \quad (33)$$

Let $Q^H U = [yz]$ and $W(\lambda)$ can be computed easily with the following expression for the determinant $w(\lambda)$ $$w(\lambda) = \left(1 + \sum_{i=1}^{N} \frac{|y_i|^2}{(d_i - \lambda)}\right)\left(1 - \sum_{i=1}^{N} \frac{|z_i|^2}{(d_i - \lambda)}\right) + \quad (34)$$

$$\left(\sum_{i=1}^{N} \frac{y_i^H z_i}{(d_i - \lambda)}\right)\left(\sum_{i=1}^{N} \frac{z_i^H y_i}{(d_i - \lambda)}\right)$$

Assuming all deflation procedures have been carried out, i.e., all $d_i$ are distinct and $q_i^H \alpha \neq 0$, $q_i^H \beta \neq 0$, simultaneously, the interlacing property relating the modified eigenvalues to the original eigenvalues is much more complicated than the rank-1 case. Combining the interlacing theorems for the rank-1 update equation (24a) and the rank-1 downdate equation (24b) simultaneously, provides the following generalized interlacing theorem for the rank-2 update:

$$d_{i+1} < \lambda_i < d_{i-1} \quad (35)$$

where $d_{N+1} = d_N - |\beta|^2$ and $d_0 = d_1 + |\alpha|^2$. That is, the modified eigenvalues are bounded by the upper and lower eigenvalues, of the original covariance matrix. In this situation, each interval may have zero, one, or two eigenvalues. Fortunately, the spectrum-slicing equation can be used to isolate the eigenvalues in disjoint intervals. Once the eigenvalues are isolated, Newton's method can be employed for the eigenvalue search. This nonlinear search can be implemented in parallel as for the rank-1 case.

The eigenvector can be determined in two steps. First, an intermediate vector, y, can be obtained as the solution of the homogeneous system equation (11), and the eigenvector, x, can be obtained explicitly in terms of y, as in equation (22). Since k=2, we can specify the homogeneous system solution $y = [1 \ v]^H$. Solving $W(\lambda) y = 0$ gives v $$v = -\frac{(1 + a)}{b} \quad (36)$$

where $$a = 1 + \sum_{i=1}^{N} \frac{|y_i|^2}{(d_i - \lambda)} \text{ and } b = \sum_{i=1}^{N} \frac{y_i^H z_i}{(d_i - \lambda)}$$

Using equation (24) we have the following explicit expression for the eigenvector $$x = -\sum_{i=1}^{N} \frac{y_i + v z_i}{(d_i - \lambda)} q_i \quad (37)$$

and $$q = \frac{x}{\|x\|_2}$$

(D) Signal and Noise Subspace Updates with Multiplicity

In many applications, it is convenient to decompose the eigenvalues and eigenvectors into signal and noise eigenvalues and eigenvectors, respectively, i.e., $$\lambda_1 \geq \lambda_2 \geq \ldots \geq \lambda_M \rangle \underset{\approx \sigma^2}{\lambda_{M+1} \approx \ldots \approx \lambda_N} \quad (38)$$

and $$S = [q_1 q_2 \ldots q_M] \quad (39)$$

$$N = [q_{M+1} \ldots q_N] \quad (40)$$

The first M eigenvalues are the signal eigenvalues corresponding to M complex sinusoids in frequency estimation or M target sources in array processing. The last N–M eigenvalues cluster to each other and correspond to the noise level. S and N are the signal and noise subspace, respectively. For a rank-1 update, the first M+1 eigenvalues and eigenvectors are modified, and the last N–M−1 eigenpairs stay the same. In order to conform to the model for M sources, we have the following update equation for eigenvalues:

$$\hat{\lambda}_1 \geq \hat{\lambda}_2 \geq \ldots \geq \hat{\lambda}_M \hat{\sigma}^2 \quad (41)$$

where $$\hat{\sigma}^2 = \frac{\hat{\lambda}_{M+1} + (N-M-1)\sigma^2}{(N-M)} \quad (42)$$

Similarly, for a rank-k update, the first M+k eigenpairs are modified, and the rest remain the same. We have the following update equation for the noise eigenvalues according to the model given by equation (38):

$$\hat{\sigma}^2 = \frac{\hat{\lambda}_{M+1} + \hat{\lambda}_{M+2} + \ldots \hat{\lambda}_{M+k} + (N-M-k)\sigma^2}{(N-M)} \quad (43)$$

If, in fact, there are only M sources, $$\{\hat{\lambda}_{M+i}\}_{i=1}^{k}$$

should be close to $\sigma^2$. If $$\{\hat{\lambda}_{M+1}\}_{i=1}^{k}$$

are not close to $\sigma^2$ there may be another sinusoid or target. This observation can be used for detection of new sources.

(E) Computational Complexity

Note that rather different techniques are used in the fast algorithm and in the conventional algorithm for solving the eigensystem. Basically, the present algorithm involves iterative search for eigenvalues (using the $LDL^H$ decomposition together with the spectrum-slicing equation) and then subsequent eigenvector computation. However, all modern eigensystem solvers involve similarity transformation for diagonalization. If a priori knowledge of the EVD of the original covariance matrix were not available, the similarity transformation technique would be generally preferred, since it has better computational efficiency and numerical properties. The present fast algorithm makes use of the fact that the eigenvalue of the modified matrix is related to the eigenvalue of the original matrix. Moreover, the eigenvalue can be isolated to disjoint intervals easily and simultaneously searched in parallel. It can be located to any desired accuracy by using a spectrum-slicing equation requiring evaluation of the inertia of a much-reduced-size (k×k) Hermitian matrix. In this situation, the computational complexity is evaluated and compared with the complexity of the conventional eigensystem solver. The results are compared with distinct eigenvalue situations. Further reduction in computational complexity can be achieved when the multiplicity of the noise eigenvalues can be exploited as discussed above in the Signal and Noise Subspace Updates section.

The grand strategy of almost all modern eigensystem solvers is to push the matrix R toward a diagonal form by a sequence of similarity transformations. If the diagonal form is obtained, then the eigenvalues are the diagonal elements, and the eigenvectors are the columns of the product matrices. The most popular algorithms, such as those used in IMSL, EISPACK, or the *Handbook for Automatic Computation*, involve the following two steps: (1) Householder transformation to reduce the matrix to tridiagonal form and (2) the QL algorithm with an implicit shift to diagonalize it. In the limit of large N, the operation count is approximately $4\frac{1}{3} N^3$.

For the algorithm described herein, the efficiency depends on the fact that the eigenvalues can be isolated easily and thus searched in parallel. For each iteration step, $W(\lambda)$ is evaluated and the inertia computed. The overall computational complexity is summarized as follows:

| Function | No. of Operations |
|---|---|
| Overhead | |
| Evaluate $S^{-1}$ | k |
| Evaluate $Q_1^H = Q^H U$ | $N^2k$ |
| Evaluate $\{q_{1i}q_{1i}\}_{i=1}^{N}$ | $Nk^2$ |
| Total | $N^2k + Nk^2 + k = N^2k$ |
| Eigenvalue | |
| Evaluate $W(\lambda)$ | $Nk^2$ |
| $LDL^H$ decomposition | $k^3$ |
| Total for $N_i$ number of iterations | $N_i(Nk^2 + k^3) = N_iNk^2$ |
| Eigenvector | |
| Backsubstitution | $N^2(k+1) \sim N^2k$ |
| Total (overhead, eigenvalue, eigenvector) | $2N^2k + N_iNk^2$ |

Thus, in general, the computational complexity is of order $2N^2k+N_iNk^2$. It corresponds to an improvement from $4\frac{1}{3} N^3$ to $2N^2k+N_iNk^2$.

(F) Numerical Properties

It should be noted that the eigenvalue can be determined to any desired accuracy by using the spectrum-slicing equation. The nonlinear search is bisection with a linear convergent rate. The number of iterations depends on the accuracy requirement, and details are discussed above in Section II-A. A numerical example is also included in Section II-A to illustrate how the spectrum-slicing equation can be used to locate the eigenvalues to any desired accuracy. The calculation of the updated eigenvectors depends upon the accurate calculation of the eigenvalues. A possible drawback of the recursive procedures is the potential error accumulation from one update to the next. Thus the eigenpairs should be as accurate as possible to avoid excessive degradation of the next decomposition, which can be accomplished either from pairwise Gram-Schmidt or from full-scale Gram-Schmidt orthogonalization procedures on the derived eigenvectors. Experimental results indicate that the pairwise Gram-Schmidt partial orthogonalization at each update seems to control the error buildup in the recursive rank-1 updating. Another approach is to refresh the procedure from time to time to avoid any possible roundoff error buildup.

III. ADAPTIVE EVD FOR FREQUENCY OR DIRECTION OF ARRIVAL ESTIMATION AND TRACKING

This section applies the modified EVD algorithms to the eigenbased techniques for frequency or angle of arrival estimation and tracking. Specifically, the adaptive versions of the principal eigenvector (PE) method of Tufts and Kumersan, the total least squares (TLS) method of Rahman and Yu, and the MUSIC algorithm are applied.

(A) Adaptive PE Method

In the linear prediction (LP) method for frequency estimation, the following LP equation is set up:

$$\begin{bmatrix} x(0) & \cdots & x(L-1) \\ \vdots & & \vdots \\ x(N-L-1) & & x(N-2) \end{bmatrix} \begin{bmatrix} c(L) \\ \vdots \\ c(I) \end{bmatrix} = \begin{bmatrix} x(L) \\ \vdots \\ x(N-1) \end{bmatrix} \quad (46)$$

or $$X^H c = x \quad (47)$$

where L is the prediction order chosen to be $M \leq L \leq N-1$, M is the number of sinusoids, and $X^H$ is the data matrix. Note that in the case of array processing for angle of arrival estimation, each row of the data matrix is a snapshot of sensor measurement. Premultiplying both sides of equation (47) by X gives the following covariance matrix normal equation:

$$Rc = r \quad (48)$$

where $R = XX^H$ and $r = Xx$. The frequency estimates can be derived from the linear prediction vector coefficient c. In a non-stationary environment, it is desirable to update the frequency estimates by modifying the LP system continuously as more and more data are available. Specifically, the LP system is modified by deleting the first k rows and appending another k rows (corresponding to a rank-2k update) as follows:

$$\begin{bmatrix} x(k) & \cdots & x(L+k-1) \\ \vdots & & \vdots \\ x(N+k-L-1) & \cdots & x(N+k-2) \end{bmatrix} \begin{bmatrix} c(L) \\ \vdots \\ c(1) \end{bmatrix} = \begin{bmatrix} x(L+k) \\ \vdots \\ x(N+k-1) \end{bmatrix} \quad (49)$$

which leads to the following modification of the covariance matrix normal equation:

$$\hat{R}\hat{c} = \hat{r} \quad (50)$$

where $$\hat{R} = R + \sum_{i=1}^{k} \alpha_i \alpha_i^H - \sum_{i=1}^{k} \beta_i \beta_i^H \quad (51)$$

and $$\hat{r} = r + \sum_{i=1}^{k} \alpha_i x(N+i-1) - \sum_{i=1}^{k} \beta_i x(L+i-1) \quad (52)$$

where $\alpha_i = [x(N+i-L-1) \ldots x(N+i-2)]^H$ and $\beta_i = [x(i-1) \ldots x(L+i-2)]^H$. The PE solution for $\hat{c}$ is obtained using the following pseudo-rank approximation (assuming that there are M sources):

$$\hat{c} = \sum_{i=1}^{M} \frac{\hat{q}_i^H \hat{r}}{\hat{\lambda}_i} \hat{q}_i \quad (53)$$

where $\hat{\lambda}_i$ and $\hat{q}_i$ are the eigenpair solutions at each time instance. The frequencies can then be obtained by first solving the zeros of the characteristic polynomials formed by $\hat{c}$. M of the zeros closest to the unit circle are then used for determining the sinusoidal frequency estimates.

Because only M principal eigenvalues and eigenvectors are used in equation (53) for solving the LP coefficient vector $\hat{c}$, it is desirable to modify the previous algorithm to monitor only the M principal eigenvalues and eigenvectors instead of the complete set of N eigenvalues and eigenvectors to facilitate computational efficiency. In order to implement the update, noise eigenvalues need to be monitored. It is not necessary to monitor the entire set of noise eigenvectors, however. Now assume the principal eigenvalue $\lambda_1 \geq \lambda_2 \geq \ldots \geq \lambda_M$, the noise eigenvalue $\sigma^2$ (of multiplicity N−M), and the signal subspace $S = [q_1 \ldots q_M]$ are available. The rank-2k update algorithm requires the knowledge of 2k noise eigenvectors, the noise eigenvalues, and the principal eigenvalues and eigenvectors. The 2k noise eigenvectors can be obtained in the normalized orthogonal projection of $\{\alpha_i\}$ and $\{\beta_i\}$ on noise subspace $N = [q_{M+1} \ldots q_N]$. These constructions lead to $q_j^H \alpha_i = 0$ and $q_j^H \beta_i = 0$ for $i = 1, \ldots k$ and $j = M+2k, \ldots N$, and it is not necessary to construct $$\{q_j\}_{j=M+2k+1}^{N}.$$

(This procedure corresponds to the deflation situation and subspace update with multiplicity as discussed in an earlier section.) $\sigma^2$ remains as the last N−M−2k+1 eigenvalue. The algorithm is summarized as follows:

1. Construct $$\{q_{M+i}\}_{i=1}^{2k}$$

such that they are orthogonal to $$\{q_i\}_{i=M+2k+1}^{N},$$

i.e., $$q_{M+j} = \alpha_j - \sum_{i=1}^{M+j-1} (q_i^H \alpha_j) q_i \quad j = 1, \ldots k$$

$$q_{M+k+j} = \beta_j - \sum_{i=1}^{M+k+j-1} (q_i^H \beta_j) q_i \quad j = 1, \ldots k$$

2. Conduct a nonlinear parallel search for $\{\hat{\lambda}_1, \hat{\lambda}_2, \ldots \hat{\lambda}_{M+2k}\}$ using (21). Conduct a nonlinear parallel search for $\{\hat{\lambda}_1, \hat{\lambda}_2, \ldots \hat{\lambda}_{M+2k}\}$ using (21).

3. Update the noise eigenvalue $\hat{\sigma}^2$ $$\hat{\sigma}^2 = \frac{\hat{\lambda}_{M+1} + \ldots + \hat{\lambda}_{M+2k} + (N-M-2k)\sigma^2}{(N-M)}$$

4. Update the signal subspace eigenvector using (24).

(B) Adaptive Total Least Squares Method

The TLS method is a refined and improved method for solving a linear system of equations when both the data matrix, $X^H$, and the observed vector, x, are contaminated by noise. In the LP method for frequency estimation, both sides of the equation are contaminated by noise. Thus it is desirable to apply the TLS method to solve the LP equation. The relative factor for weighting the noise contribution for both sides of the equation is equal to 1, because $X^H$ and x are derived from the same noisy samples $\{x(i)\}$. This leads to the following homogeneous system of equations:

$$\begin{bmatrix} x(0) & \cdots & x(L) \\ \vdots & & \vdots \\ x(N-L-1) & & x(N-1) \end{bmatrix} \begin{bmatrix} c \\ -1 \end{bmatrix} = 0 \quad (54)$$

or in terms of the covariance matrix $$R \begin{bmatrix} c \\ -1 \end{bmatrix} = 0 \quad (55)$$

where $R = XX^H$ and $X^H$ is the data matrix for (54). In a time-varying environment, we delete k rows and append k rows to the data matrix $X^H$ in (54) as done in the adaptive PE method discussed above, leading to the following rank-2k modification of equation (55):

$$\hat{R} \begin{bmatrix} c \\ -1 \end{bmatrix} = 0 \text{ where} \quad (56)$$

$$\hat{R} = R + \sum_{i=1}^{k} \alpha_i \alpha_i^H - \sum_{i=1}^{k} \beta_i \beta_i^H \text{ and } \{\alpha_i\}, \{\beta_i\}$$

are the appended and deleted rows, respectively. The TLS solution is obtained as the null vector solution of $\hat{R}$. In general, for M sinusoids or M target sources, there are N−M number of minimum eigenvalues and eigenvectors. Any vector in the noise subspace is a solution. Out of these infinite number of solutions, one can choose the following minimum norm solution:

$$\hat{c} = - \sum_{k=M+1}^{N} \frac{[\hat{q}_k^*]_{L+1}}{\sum_{k=M+1}^{N} [\hat{q}_k^*]_{L+1}} \hat{q}_k' \text{ where } \hat{q}_k = \begin{bmatrix} \hat{q}_k' \\ [\hat{q}_k]_{L+1} \end{bmatrix} \quad (57)$$

Thus, in the TLS solution, it is the noise subspace $N = [q_{M+1} \ldots q_N]$ that must be monitored. Because the signal eigenvalues and eigenvectors are also used for updating the noise eigensystem, reduction in computational complexity, as done in the adaptive PE method, is not achieved.

(C) Adaptive MUSIC

In this subsection, the recursive version of a class of high-resolution algorithms is considered for multiple target angle estimation or frequency estimation based on the eigenvalue decomposition of the ensemble-averaged covariance matrix of the received signal. Consider a system of K moving targets to be tracked by an array of M sensors. The sensors are linearly distributed with each sensor separated by a distance d from the adjacent sensor. For a narrowband signal, the model of the output of the m-th sensor becomes $$r_m(t) = \sum_{k=1}^{K} A_k(t) e^{j2\pi T_k(t) \frac{(m-1)d}{\lambda}} + n_m(t) \; m = 1, 2, \ldots M \quad (58)$$

where $A_k(t)$ is the complex amplitude of the k-th target at time t, $T_k(t) = \sin\{\theta_k(t)\}$ where $\theta_k(t)$ is the angle of arrival of the k-th target at time t, and $N_m(t)$ is the m-th sensor noise. Using vector notation, equation (58) can be written as $$r(t) = A(t)s(t) + N(t) \quad (59)$$

where $$r(t) = \begin{bmatrix} r_1(t) \\ r_2(t) \\ \vdots \\ r_{M(t)} \end{bmatrix} s(t) = \begin{bmatrix} s_1(t) \\ s_2(t) \\ \vdots \\ s_{K(t)} \end{bmatrix} n(t) = \begin{bmatrix} n_1(t) \\ n_2(t) \\ \vdots \\ n_{M(t)} \end{bmatrix}$$

and the M×K direction of arrival (DOA) matrix A(t) is defined as $$A(t) = \begin{bmatrix} 1 & 1 & \cdots & 1 \\ e^{j2\pi \frac{T_1 d}{\lambda}} & e^{j2\pi \frac{T_2 d}{\lambda}} & & e^{j2\pi \frac{T_k d}{d}} \\ \vdots & \vdots & & \vdots \\ e^{j2\pi T_1 \frac{(M-1)d}{\lambda}} & e^{j2\pi T_2 \frac{(M-1)d}{\lambda}} & & e^{j2\pi T_k (M-1)d} \end{bmatrix}$$

The output covariance matrix can then be expressed as follows:

$$R(t) = A(t)S(t)A^H(t) + \sigma^2(t)I \quad (60)$$

where $S(t) = E[s(t)s^H(t)]$ is the signal covariance matrix, and $\sigma^2(t)$ is the noise power. Assuming that K<M, the MUSIC algorithm applied at time t yields an estimate of the number of targets K, their DOA $\{\theta_k(t)\}$, the signal covariance matrix S(t), and the noise power $\sigma^2(t)$, by examining the eigenstructure of the output covariance matrix R(t). R(t) can be estimated from an ensemble of outer products of snapshots in a sliding window or in an exponential forgetting window as discussed in Section 1.

The MUSIC algorithm and its root-finding variations are briefly reviewed here. Suppose at time t, the estimated covariance matrix has the following EVD:

$$R = \sum_{i=1}^{N} \lambda_i q_i q_i^H \quad (61)$$

$$= \sum_{i=1}^{K} \lambda_i q_i q_i^H + \sigma^2 \sum_{i=k+1}^{n} q_i q_i^H$$

The algorithm depends on the fact that that the noise subspace $E_N = [q_{K+1} \ldots q_M]$ is orthogonal to the signal manifold; i.e., $$E_N^H u(\theta) = 0 \quad (62)$$

where $u(\theta)$ is the steering vector of the angles to be searched. The conventional MUSIC algorithm involves searching for the peaks of the following eigenspectrum:

$$J(\theta) = \frac{u^H(\theta)u(\theta)}{u^H(\theta)E_N E_N^H u(\theta)} \quad (63)$$

To do this, the complete angular interval $$\frac{-\pi}{2} \leq \theta \leq \frac{\pi}{2}$$

is scanned. One can avoid the need for this one-dimensional scanning by the use of a root-finding approach. This can be accomplished by, for example, using a known root-MUSIC or minimum norm algorithm.

In the root-MUSIC algorithm, $$e^{j2\pi \frac{T_x d}{\lambda}}$$

is replaced by the complex variable z in the eigenspectrum J(θ) defined in (63). Let D(z) denote the resulting denominator polynomial. The polynomial D(z) can be expressed as the product of two polynomials, H(z) and H(z⁻¹), each with real coefficients. The first polynomial, H(z), has its zero inside or on the unit circle; K of them will be on (or very close to) the unit circle and represent the signal zero. The remaining ones represent extraneous zeros. The zeros of the other polynomial, H(z⁻¹), lie on or outside the unit circle, exhibiting inverse symmetry with respect to the zero of H(z). The angle estimation is thus performed by extracting the zeros of the polynomial D(z) and identifying the signal zeros from the knowledge that they should lie on the unit circle.

The minimum norm algorithm is derived by linearly combining the noise eigenvectors such that:

1. The first element of the resulting noise eigenvector is unity.
2. The resulting noise eigenvector lies in the noise subspace.
3. The resulting vector norm is minimum.

Equation (62) is then modified to $$A(\theta) = \frac{\delta_1^H E_N E_N^H u(\theta)}{\delta_1^H E_N E_N^H \delta_1} = 0 \tag{64}$$

where $\delta={}_1{}^H=[1 0 \ldots 0]$. The angle estimation problem is then solved by computing the zeros of the resulting polynomial of equation (64) and identifying the signal zeros as the K zeros of A(z) that lie on (or very close to) the unit circle.

(IV.) SIMULATION RESULTS (A) Numerical Properties

In this section, the numerical performance of the discussed algorithms are considered as demonstrated by simulation. The simulations are performed with a time-varying signal in additive white noise. Consider the measurement model (Equation 58) for a scenario where there are three sources (K=3) impinging on a linear array of 10 sensors (M=10). The signal-to-noise ratio for each source is 20 dB. The angles are given by $$\theta_1(t) = 5°, \theta_2(t) = 22° \text{ and } \theta_3 = 12° \cdot (K-1)\frac{2}{299}.$$

In each experiment, 100 updates are carried out. Each EVD update is obtained by updating the covariance matrix derived from the data snapshots within a window of length 41.

As recursive procedures may suffer potential error accumulation from one update to the next, therefore the sensitivity of the exemplary algorithm was investigated as a function of the order of the matrix, and the accuracy requirements for the eigenvalues searched. Stability and sensitivity tests have been conducted for this algorithm and comparisons of the performance of the recursive algorithms with conventional measures.

The angle estimates for various sizes of matrices (M=7, 10) and eigenvalue search accuracy requirements (tol E-10, E-5) were compared with the estimates obtained from a conventional routine. It was observed that the performance is merely a function of the size of the matrix used, and is not dependent on whether a conventional eigenvalue decomposition routine or the present recursive procedure for the eigenvalue decomposition is used, nor on the accuracy requirements on the eigenvalue search. In fact the results are practically the same for each case.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. A method for locating a plurality of radarjammers, comprising the steps of:
   (a) sampling aperture data received by an antenna array, wherein the sampled aperture data include data that do not correspond to echo returns from a beam transmitted by the antenna;
   (b) generating a covariance matrix using the sampled aperture data;
   (c) performing an eigenvalue decomposition on the covariance matrix;
   (d) determining a respective direction of arrival from which each of a plurality of jammers is transmitting a signal included in the sampled aperture data, based on the eigenvalue decomposition, using a super-resolution subspace algorithm to estimate the direction of arrival of signals from each of the plurality of jammers.

2. The method of claim 1, further comprising the step of providing the direction of arrival to a tracker.

3. The method of claim 1, wherein step (d) includes determining an angular location of a jammer that is not within a mainlobe of the antenna array.

4. The method of claim 1, wherein step (d) includes determining angular locations of a plurality of jammers that are located within one or more sidelobes of the antenna array.

5. The method of claim 4, wherein step (d) includes determining an angular location of an additional jammer that is within a mainlobe of the antenna array.

6. The method of claim 5, wherein step (d) includes determining angular locations of a further plurality of jammers that are within the mainlobe of the antenna array.

7. The method of claim 1, wherein step (d) includes determining angular locations of a plurality of jammers that are within a mainlobe of the antenna array.

8. The method of claim 1, wherein steps (a) through (d) are performed by a radar system that is operating in surveillance mode.

9. The method of claim 1, further comprising:
   (e) updating the covariance matrix repeatedly based on additional sampled aperture data;
   (f) updating the eigenvalue decomposition each time the covariance matrix is updated;
   (g) determining a number of jammers within a field of view of the antenna based on the updated eigenvalue decomposition.

10. The method of claim 9, wherein the number of jammers within the field of view is determined based on a number of significant eigenvalues of the covariance matrix.

11. The method of claim 9, wherein the updates of step (e) are performed at regular intervals.

12. The method of claim 11, wherein the regular intervals have a period of between about one millisecond and about ten milliseconds.

13. The method of claim 9, wherein step (e) includes using a sliding window to update the covariance matrix.

14. The method of claim 9, wherein a fast parallel algorithm is used for estimating the updated eigenvalue decomposition.

15. The method of claim 1, further comprising:

(e) periodically generating the covariance matrix based on additional sampled aperture data;

(f) evaluating the eigenvalue decomposition by block processing each time the covariance matrix is evaluated;

(g) determining a number of jammer,withina field of view of the antenna based on the updated eigenvalue decomposition.

16. A radar processing system, comprising:

means for sampling aperture data received by an antenna array, wherein the sampled aperture data include data that do not correspond to echo returns from a beam transmitted by the antenna;

means for generating a covariance matrix using the sampled aperture data;

means for performing an eigenvalue decomposition on the covariance matrix;

means for determining a respective direction of arrival from which each of a plurality of jammers is transmitting a signal included in the sampled aperture data, based on the eigenvalue decomposition, the determining means using a super-resolution subspace algorithm to estimate the direction of arrival of signals from each of the plurality of jammers.

17. The system of claim 16, wherein the direction of arrival is provided to a tracker.

18. The system of claim 16, wherein the direction determining means determines an angular location of a jammer that is not within a mainlobe of the antenna array.

19. The system of claim 16, wherein the direction determining means determines angular locations of a plurality of jammers that are located within one or more sidelobes of the antenna array.

20. The system of claim 19, wherein the direction determining means determines an angular location of an additional jammer that is within a mainlobe of the antenna array.

21. The system of claim 20, wherein the direction determining means determines angular locations of a further plurality of jammers that are within the mainlobe of the antenna array.

22. The system of claim 16, wherein the direction determining means determines angular locations of a plurality of jammers that are within a mainlobe of the antenna array.

23. The system of claim 16, wherein the direction determining means operates while the radar system is operating in surveillance mode.

24. The system of claim 16, further comprising:

means for updating the covariance matrix repeatedly based on additional sampled aperture data;

means for updating the eigenvalue decomposition each time the covariance matrix is updated;

means for determining a number of jammers within a field of view of the antenna based on the updated eigenvalue decomposition.

25. The system of claim 24, wherein the number of jammers within the field of view is determined based on a number of significant eigenvalues of the covariance matrix.

26. The system of claim 24, wherein covariance matrix updates are performed at regular intervals.

27. The system of claim 26, wherein the regular intervals have a period of between about one millisecond and about ten milliseconds.

28. The system of claim 24, wherein a sliding window is used to update the covariance matrix.

29. The system of claim 24, wherein a fast parallel algorithm is used for estimating the updated eigenvalue decomposition.

30. The system of claim 16, further comprising:

(e) means for periodically generating the covariance matrix based on additional sampled aperture data;

(f) means for evaluating the eigenvalue decomposition by block processing each time the covariance matrix is evaluated;

(g) means for determining a number of jammers within a field of view of the antenna based on the updated eigenvalue decomposition.

* * * * *